Figure 1:
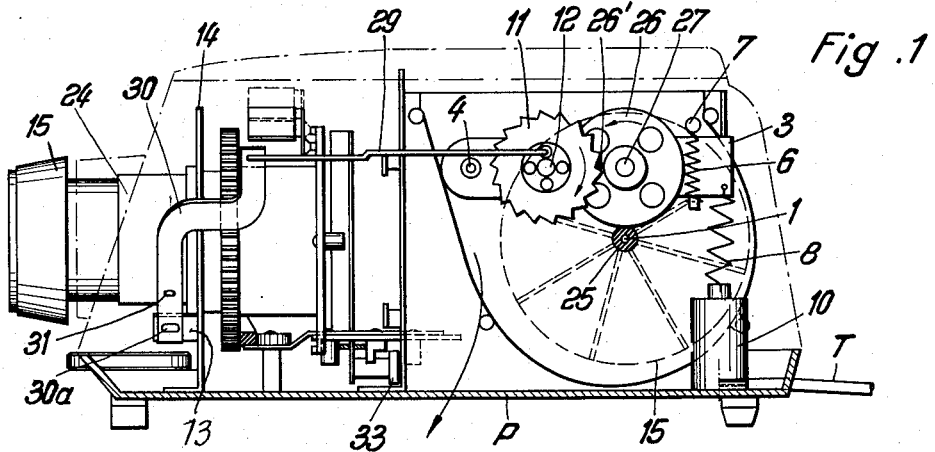

April 10, 1962     E. ZILLMER     3,028,788

FOCUSING MECHANISM FOR PROJECTOR

Filed April 27, 1959

Inventor:
E. Zillmer

United States Patent Office 3,028,788
Patented Apr. 10, 1962

3,028,788
FOCUSING MECHANISM FOR PROJECTOR
Erich Zillmer, Saarbruckener Strasse 263,
Braunschweig-Lehndorf, Germany
Filed Apr. 27, 1959, Ser. No. 809,232
Claims priority, application Germany Oct. 17, 1958
3 Claims. (Cl. 88—26)

The present invention relates to a projector and more particularly to a projector which is provided with an electric motor for driving certain movable parts of its mechanism.

It is an object of the present invention to provide an apparatus for focusing the lens of a projector by means of a motor which is required for the normal operation of the projector and has to remain in rotation during the entire length of its use.

A further object of the invention is to provide an apparatus for focusing the lens of a projector from a remote point which is connected to the projector by a cable or the like so that the operator of the projector may focus the same without being required to stand next to it and, for example, while he is sitting down or standing directly in front of the projection screen to explain the pictures appearing thereon.

While the present invention is applicable to any kind of projector which contains a motor which has to remain in operation while the projector is being used, and may also be applied to a motion-picture projector, it is in its preferred embodiment as herein described primarily concerned with a slide projector since the need for refocusing of the projector lens during the projection of a larger number of pictures is usually more prevalent in a slide projector than in a motion-picture projector. This is principally due to the fact that for projection the individual pictures taken with a still camera are usually mounted in frames, either with or without glass plates, which often have different thicknesses. Consequently, when inserted into the projector, and resting against a stop surface, the individual slides will not always be at the same focal distance and, even though the projector has been sharply focused at the first slide, subsequent slides may appear out of focus on the projection screen. It is thus necessary during a performance to refocus the projector lens at frequent intervals.

The present invention consists in the provision of focusing means for a projector which may be operated by means of a motor which is normally required in the projector and maintained in rotation during an entire performance. By the simple operation of a hand switch or pushbutton on the end of a cable which is connected to the projector, the operator of the projector may thus quickly refocus the projector lens from any place within the room and also while he is standing directly in front of the projection screen to explain the individual pictures.

In the preferred embodiment of the invention as subsequently described, the focusing means are driven by an electric motor, the principal function of which is to drive a cooling fan for ventilating the lamp housing of the projector. Such a motor is especially adapted for the purposes of the invention because it remains in constant operation as long as the projector lamp is switched on.

Another object of the present invention resides in a particular advantageous arrangement of the cooling fan and its electric motor at a position laterally of the lamp housing of the projector.

These and other objects, features, and advantages of the present invention will be further apparent from the following detailed description thereof, particularly when read with reference to the accompanying drawings, in which—

Figure 2:
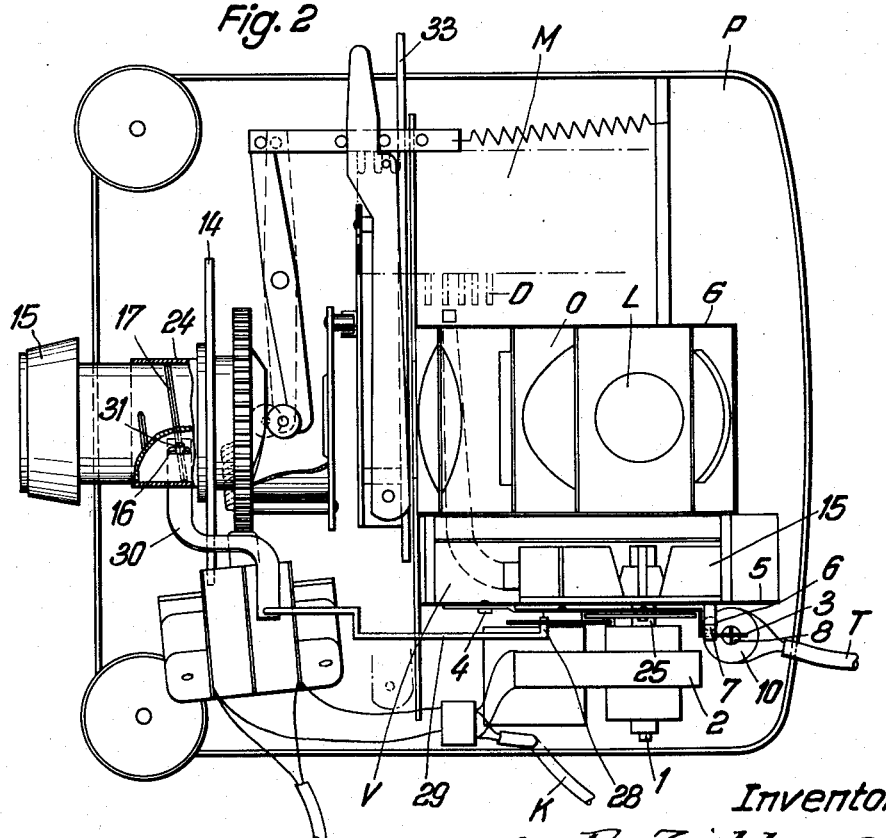

FIGURE 1 shows a side view of the projector from which the hood which normally covers the apparatus and is mounted on its base has been removed, said hood being indicated by dot-and-dash lines; while FIGURE 2 shows a plan view of the projector, likewise without the hood.

As illustrated in the drawings, the base plate P of the projector supports a lamp housing G with a lamp L and an optical system O, and at one side of the lamp housing a slides magazine M for holding the slides D, and at the other side of the lamp housing G a cooling fan 15 which is driven by an electric motor 2 for ventilating the lamp housing. Motor 2 is adapted to be connected to a power line by a cable K, and between motor 2 and the fan wheel 15 a bushing 25 of rubber, vulcanized fiber, or other material of high frictional properties is directly secured to the motor shaft 1.

Above this bushing 25 and within the same vertical plane, a friction disk 26 is rotatably mounted on a bearing stud 27 which is secured to a one-armed lever 3 which, in turn, is pivotable about a stud 4 on a side wall 5 of the fan housing V. A spring 6 is connected at one end to the free end of lever 3 and at its other end to a stud 7 which is secured to wall 5 of fan housing V. This stud 7 also forms a stop member against which the lever 3 is normally drawn by the action of spring 6 so as to maintain the friction disk 26 out of engagement with the friction bushing 25.

The free end of lever 3 is furthermore resiliently connected by a spring 8 to the movable armature of an electromagnet 10 which is connected by a cable T to a suitable switch or pushbutton which is located at a point remote from the projector, for example, at the projection screen, and may be operated by hand. This cable T is preferably of the flexible type so that the operator may operate the switch or pushbutton from any point within the room.

Lever 3 also forms the support of a ratchet wheel 11 which is rotatably mounted on a stud 12 within a vertical plane which is disposed in front of the plane in which the friction disk 26 is mounted so that ratchet wheel 11 partly overlaps the friction disk. This friction disk further has a pin 26' mounted on its side facing toward ratchet wheel 11 and in a radial position thereon so as to engage once at each revolution of disk 26 with one of the teeth of ratchet wheel 11 to advance the latter by the spacing of one tooth.

This steplike movement is transmitted by ratchet wheel 11 to a connecting rod 29 which has a crankpin 28 on one end engaging into a bore in an eccentric position in ratchet wheel 11, while its other end engages into the free end of a one-armed setting lever 30, the other end of which is pivotably secured by a pin 30a on a lug 13 on a wall 14 which carries the lens tube 24 in which the lens mount 16 of the projector lens is axially and rotatably adjusted.

Another pin 31 on setting lever 30 passes through an elongated slot 18 in the wall of lens tube 24 and engages into a helical groove 17 in the lens mount 16.

If the projected image of a slide D, which is moved from the magazine M in front of the lamp housing G, does not appear in sharp focus on the projection screen, the operator of the projector may switch on the electromagnet 10 from any remote point through the cable connection T, whereby lever 3 will be moved downwardly and the friction disk 26 will be moved into engagement with the friction bushing 25 on fan shaft 1 which is constantly rotating as long as the projector is being used. Friction disk 26 will thus also be rotated and at each revolution thereof its pin 26' will advance the ratchet wheel 11 by one tooth spacing. This steplike movement will be transmitted by connecting rod 29 and setting lever 30 to pin 31 which will thus be shifted in one direction or the other parallel to the optical axis within the helical groove 17 of lens mount 16 and will, thereby, in turn shift the latter in the axial direction until the projected image is sharply focused on the projection screen. Thereupon the operator switches off the electromagnet 10 and thereby disengages the frictional drive so that the lens setting will remain in the adjusted position.

Assuming that the lens mount 16 has to be shifted forwardly in order to attain the projected image in sharp focus, and that during the previous setting operation the setting mechanism 26, 11, 29, and 30 had been stopped in a position in which, at a renewed setting the lens mount 16 would be at first shifted toward the rear, the operator merely has to keep the switch button on the free end of cable T depressed until the connecting rod 29 is again moved by ratchet wheel 11 in the forward direction. In view of the high speed of rotation of the friction bushing 25, the entire focal adjustment according to the invention may be carried out almost instantly.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination with a slide projector apparatus having a lamp housing for a projection lamp, a cooling fan for ventilating said housing, an electric motor constantly rotating in the same direction during the operation of the projector apparatus, the shaft of said motor being in driving connection with said cooling fan, a projection lens mount shiftable in both directions along the optical axis of the lens and an operating device for shifting the mount for focusing the projecting lens comprising, in combination, a driving wheel mounted on the shaft of said motor, a member movably mounted on said apparatus, a driven wheel and a toothed wheel rotatably mounted on said member on spaced parallel axes, a pin secured to said driven wheel eccentrically of its axis and engageable with a tooth of the toothed wheel, means for biasing said member to normally maintain the driven wheel out of engagement with the driving wheel, an electromagnet for moving said member upon energization thereof to drivingly engage the driven wheel with the driving wheel to advance the toothed wheel at least one tooth spacing for each revolution of the driven wheel, a single control knob for controlling said electromagnet, and means operated by the toothed wheel for shifting said lens mount along the optical axis at every revolution of said driven wheel.

2. The combination as defined in claim 1, further comprising a cable connected at one end to said electromagnet and having a single on- and off-switch at the other end for operating said electromagnet to adjust the focus of said projector lens from a point remote from said projector apparatus.

3. The combination as claimed in claim 1, in which the means operated by the toothed wheel includes a connecting rod pivotally connected at one end to the toothed wheel eccentrically thereof, and connecting means between the rod and lens mount.

References Cited in the file of this patent

UNITED STATES PATENTS

| 1,271,748 | Nelson | July 9, 1918 |
| 1,271,929 | Nelson | July 9, 1918 |
| 1,620,768 | Joy | Mar. 15, 1927 |
| 1,921,214 | Carpenter | Aug. 8, 1933 |
| 2,008,020 | Jackman | July 16, 1935 |
| 2,872,841 | Thorburn | Feb. 10, 1959 |

FOREIGN PATENTS

| 6,432 | Great Britain | of 1913 |